UNITED STATES PATENT OFFICE.

ROSER B. SUTTER, OF NEWARK, NEW JERSEY, ASSIGNOR TO ZENITHERM COMPANY, OF NEWARK, NEW JERSEY, A CORPORATION OF NEW JERSEY.

WATERPROOFED MATERIAL AND PROCESS OF MAKING SAME.

1,351,087.     Specification of Letters Patent.     Patented Aug. 31, 1920.

No Drawing.     Application filed March 2, 1917. Serial No. 151,962.

*To all whom it may concern:*

Be it known that I, ROSER B. SUTTER, a citizen of the United States, residing at Newark, New Jersey, have invented certain new and useful Improvements in Waterproofed Materials and Processes of Making Same, of which the following is a clear, full, and exact description.

This invention relates to the treatment of hygroscopic materials to render them non-hygroscopic and water-repellent, and has for one of its particular objects the treatment of kieselguhr or infusorial earth to render this valuable material available for many uses for which it has hitherto been found unsuitable because of its highly hygroscopic character.

Infusorial earth, because of its lightness and its non-conductivity for heat and electricity, and also because of its relative cheapness, is a highly desirable material for structural uses, particularly for use in securing heat insulation in ovens, refrigerators and buildings. Up to the present time, however, it has been found available only for use as an insulator for high temperatures, its water-absorbing properties rendering it unsuitable in its natural state for low temperature insulation, as for example in the walls of refrigerators and cold storage warehouses. It has been used, however, to a limited extent for the last mentioned purposes, but only when packed between other waterproof materials.

One object of the invention is so to treat this material that it may be used in all places where insulating material is desirable, regardless of the temperatures to be maintained or the conditions as to moisture. To this end an object of the invention is a process of waterproofing materials of the nature of infusorial earth by which such materials may be rendered non-hygroscopic, without affecting, to any appreciable extent, their natural properties so far as specific gravity, durability, non-conductivity and sound-proofing qualities are concerned, and also without rendering such materials poisonous or otherwise injurious, or the product liable to deterioration in the course of time.

Another object of the invention is a waterproofing process which will render the individual particles of the material waterproof throughout by precipitating the waterproofing agent within the pores of the particles themselves.

More particularly the invention aims to render the material treated not only non-hygroscopic but also water repellent, the latter characteristic, especially, being a peculiar result of the treatment of the material by the process of this invention. While the change of the character of the material treated from hygroscopic to non-hygroscopic prevents absorption and retention of moisture by the material itself, the water repellant quality imparted to the material extends its effect beyond the material and over the surroundings of the water repellent particles of the materials. In other words, it also protects the other fillers and the binders cementing the kieselguhr or infusorial earth together in the product; it protects the entire product from moisture.

The process of the invention consists, essentially, in the formation of an insoluble metallic soap directly in the particles of the infusorial earth or other hygroscopic material, by first saturating said material with a solution of an ordinary soap and then forming in said material a precipitate of the insoluble metallic soap by adding to said solution a soluble salt of one of the metals which form such soaps, for example, a salt of calcium or magnesium. It will be understood of course that the process is not limited to the particular order of steps recited, since it may also be practised by first treating the material with the solution of the salt and then treating it with the soap solution.

In practising my invention in the preferred manner, I make a dilute solution, preferably hot, of an ordinary soap, and then introduce the infusorial earth, or other material to be waterproofed, into this solution and allow the same to remain in the solution until it becomes thoroughly saturated with the solution. The saturation of the material with the solution can of course be hastened by stirring the material in the solution, although this is not necessary.

After the material has become thoroughly saturated with the hot soap solution, the solution of the precipitating agent is added to the solution in which the saturated material is, the precipitating agent being a salt of one of the metals which react with the soap to form an insoluble soap, and is chosen partly with reference to the composition of the soap used in forming the soap solution and partly with reference to the particular product to be formed. For example, if a white product is desired, a salt of calcium, magnesium, etc., is used. If a colored product is desired, then a salt of copper, iron, etc., may be used. The proportion of the salt is determined either experimentally or by analysis of the soap, and the solution of the precipitating salt is added cold, thus insuring that the insoluble soap will be precipitated within the particles themselves. By its contracting action upon the hot soap solution in the particles, the cold solution tends to force the precipitating insoluble soap all through the particles and to lock the precipitate within the pores of the particles. The result is thus a product in which the pores are completely filled with the insoluble precipitate. The reaction is very quick, and after a few minutes the process is completed.

The thorough water-proofing throughout the entire particle instead of a mere superficial protection is of the essence of the present invention and distinguishes both the process and the product of this invention from what has been done heretofore. One of the most important steps in this process is the use of the first solution hot, or else the heating of the material when it has been saturated with the first solution, and then the contracting of this solution in the pores of the material by adding the precipitant cold, thus causing it to be forced into these pores to occupy the space vacated by the contracting first solution. The mechanical force of atmospheric pressure employed in this process acts quickly and irresistibly while the exchange which take place through the cell walls between two cold solutions by osmotic pressure would be slow and incomplete, stopping as soon as the walls of the cells should become clogged by the forming precipitate, which naturally would form first just where the two solutions meet, that is, in these walls.

The chemical reaction upon which the process is based is well known. Inasmuch as the soluble soaps are sodium, or potassium salts of fatty and resinous acids, the formation of the insoluble soap by the substitution for the sodium or potassium of calcium, magnesium, lead or other heavy metal produces, as one of its by-products, a hydroxid or salt of the alkali metal of which the soluble soap was formed, but this is usually not produced in such quantities as to affect the quality of the product. However, this by-product is soluble and may be removed by washing if desired.

An important advantage of the product of this process is that it may be bound together by a water setting binder, without danger of its giving up water into the binder after the setting operation has begun and thus interfering with the proper setting or the length of the time required for the setting of the binder. Likewise it is prevented from absorbing and retaining, as it does in the raw state, an indefinite and usually large amount of this binder, which is lost for the setting process and afterward appears upon the surface of the product as disfiguring efflorescences. Hence the proportion of the binder required can be definitely standardized and, moreover, the concentration of the solutions may be so arranged that the product obtained can be mixed with a suitable binder without further drying.

Infusorial earth in its natural state contains a considerable percentage of water. When air dried, the weight of infusorial earth decreases from 10 to 25%. The dry weight of the material is increased very little by this process, perhaps from 2 to 5%, and none of the natural and valuable properties of the raw material is in the least impaired by the process. When infusorial earth is dried in kilns, with the application of heat, this material, if treated according to this process, is lighter, when thoroughly dry, than the raw material, and by reason of its inability to absorb moisture and electrolytes, it has the advantage over the raw material that its insulating power remains constantly the same, since it is not affected by weather conditions.

Another advantage over waterproofing by processes heretofore known, is that the material contains nothing subject to decay.

In forming the product into structural materials it may be bound together, as above suggested by a water setting binder, or since it is plastic by itself as a result of the treatment, it may be directly molded into forms, being bound together preferably in such case by fibrous binders, such as asbestos or hair, which when minutely distributed through the mass improve the natural plasticity of the material and at the same time by felting the mass together insure greater strength in the resultant material. An important advantage obtained from the waterproofing process, when the material is bound together by a water setting binder, is that the waterproofing of the individual particles prevents the particles from absorbing the binder, and thus the amount of binder required becomes a known factor in the mixture as it is in direct proportion to the purpose it has to serve and is very small; the weight of the product is not materially increased by the addition of the binder.

In the practice of the present invention, it is also contemplated to unite the particles of the material by a refractory binder which will combine with the metallic soap under the action of heat in pursuit of certain purposes for which the product may be intended. Moreover, it has been found that when infusorial earth or kieselguhr, waterproofed in the manner hereinabove set forth, is heated above a certain temperature degree, a refractory binder is formed which firmly unites the particles of the material.

To produce structural material having a refractory binder of the kind last described, articles made from water-proofed kieselguhr, in which a metallic soap has been used as the only binder, are exposed to a temperature of about 500° F. or more. At this temperature the metallic soap will be decomposed and the fatty and resinous acids burned out, and the material will lose its water-repellent character. The material itself, however, will not be destroyed nor even deformed by the heat, and the particles will still be firmly bound together.

The product thus formed is apparently the result of the fritting together, in the heat, of the metallic bases of the destroyed soaps with the alkalies of the original soaps used, together with an adequate, though small, portion of the kieselguhr, thus forming a framework of insoluble complex silicates in the product, substantial enough to firmly unite the particles of kieselguhr without requiring the aid of any additional binders, but still so small in proportion that they cannot alter the conchylaceous structure of the kieselguhr nor increase its fusibility. The product into which the waterproofed kieselguhr is thus transformed by the action of heat upon the metallic soap retains its original shape without warping, shrinking, cracking or crumbling, and while it will absorb water after the soap has thus been destroyed, it is not disintegrated or even weakened by such absorption, since no soluble products are formed in the transformation. Moreover, the highly refractory quality, lightness, and heat insulating power of the native kieselguhr are preserved, and the transformation renders the product particularly fit to withstand the highest degrees of dry heat.

The metallic soap may to equal advantage be burned out before the products are used, or it may be left in the same to disappear during use. Waterproofed kieselguhr thus burned out will also withstand boiling for an indefinite period without being decomposed or changed in any way or manner.

What I claim as new is:

1. The process of waterproofing hygroscopic material, which consists in saturating said material first with one of the following solutions and then adding to said material the other of said solutions, said solutions comprising a soap solution and a solution of a salt of a metal which reacts with the soap to precipitate an insoluble soap of the said metal, the first of said solutions used being applied in a hot condition and the other solution being added cold while the material saturated with the first solution is in the wet heated condition thereby produced.

2. The process of waterproofing hygroscopic material, which consists in saturating and bringing into heated condition the material to be waterproofed, the saturating agent being either a soap solution or a solution of a salt of a metal which reacts with the soap to precipitate an insoluble soap of the said metal, and then adding the other of the aforementioned solutions and simultaneously effecting a marked reduction in the temperature of the saturated material.

3. The process of waterproofing hygroscopic material, which consists in saturating said material with a hot soap solution and then forming in said material while in the wet heated condition thus produced, a precipitate of an insoluble metallic soap by adding to said solution a cold solution of a salt of one of the metals which form such soaps.

4. The process of rendering hygroscopic material non-hygroscopic and water-repellent, which consists in saturating said material first with one of the following solutions, and then, while the material is still wet, adding to said material the other of said solutions, said solutions comprising a soap solution and a solution of a salt of a metal which reacts with the soap to precipitate an insoluble soap of the said metal, and then washing out the soluble by-product formed by the reaction.

5. The process of waterproofing infusorial earth or kieselguhr, which consists in introducing said material in dry powdered form into a hot soap solution, and when said material is thoroughly saturated and while still hot adding to said material a cold solution of a salt of a metal which will react with said soap to precipitate an insoluble soap of said metal.

6. The process of rendering infusorial earth or kieselguhr non-hygroscopic and water repellent, which consists in drying said material to remove the moisture that it contains in its natural state, then first saturating said material with one of the following solutions and then, while the material is still wet, adding to said material the other of said solutions, said solutions comprising a soap solution and a solution of a salt of a metal which reacts with the soap to precipitate an insoluble soap of the said metal, the first solution being applied in a hot condition and the other solution being added cold while the material saturated with the first solution is in the wet heated condition thereby produced.

7. The process of forming non-hygroscopic and water-repellent structural material, which consists in preparing a hot soap solution, introducing the material to be waterproofed into said solution and when said material is thoroughly saturated, and while in the heated condition produced by the first solution, adding to said solution a cold solution of a salt of a metal which will react with said soap to precipitate an insoluble soap of the said metal, and then molding said material while in plastic condition into the desired form.

8. The process of rendering hygroscopic material non-hygroscopic and water repellent, which consists in saturating said material first with one of the following solutions, and then adding to such material the other of said solutions, said solutions comprising a soap solution and a solution of a salt of a metal which reacts with the soap to precipitate an insoluble soap of the said metal, then washing out the soluble by-product formed by the reaction and, while the mixture is still wet, uniting the particles thereof by means of a water setting binder.

9. The process of forming non-hygroscopic insulating material, which consists in saturating kieselguhr or infusorial earth with a soap solution, then forming in said material a precipitate of an insoluble metallic soap by adding to said solution a soluble salt of one of the metals which form said soaps, and then uniting the particles of said material by a water setting binder.

10. The process of forming structural material from infusorial earth or kieselguhr, which consists in saturating said material with a hot soap solution, then adding to such material a cold solution of a salt of a metal which will react with said soap to precipitate an insoluble soap of said metal, washing out from the resultant product the soluble hydroxid or salt produced by the reaction, and, while the material is still wet, mixing therewith a water setting binder.

11. A water repellent structural material, comprising kieselguhr or infusorial earth having precipitated within the individual particles thereof an insoluble metallic soap.

12. A water repellent structural material, comprising kieselguhr or infusorial earth having precipitated within the individual particles thereof an insoluble metallic soap, and a binder for the particles of said material.

13. A water repellent structural material, comprising kieselguhr or infusorial earth having precipitated within the individual particles thereof an insoluble metallic soap, and a fibrous binder for the particles of said material.

14. A water repellent structural material, comprising kieselguhr or infusorial earth having precipitated within the individual particles thereof an insoluble metallic soap, the particles of said material being united by a water setting binder.

15. A structural material, comprising kieselguhr or infusorial earth and a refractory binder by which the particles of said material are held together.

16. A structural material, comprising kieselguhr or infusorial earth and a refractory binder uniting the particles of said material, said binder being formed by heating beyond the point of decomposition of the metallic soap, kieselguhr or infusorial earth, within the particles of which a metallic soap has been precipitated.

Signed at New York, N. Y., this 28th day of February, 1917.

ROSER B. SUTTER.

Witnesses:
 LOUIS M. ATHA,
 FRED OTTMAN.